W. L. HAMILTON.
MOTOR CONTROL SYSTEM.
APPLICATION FILED JUNE 17, 1920.
1,362,301.
Patented Dec. 14, 1920.
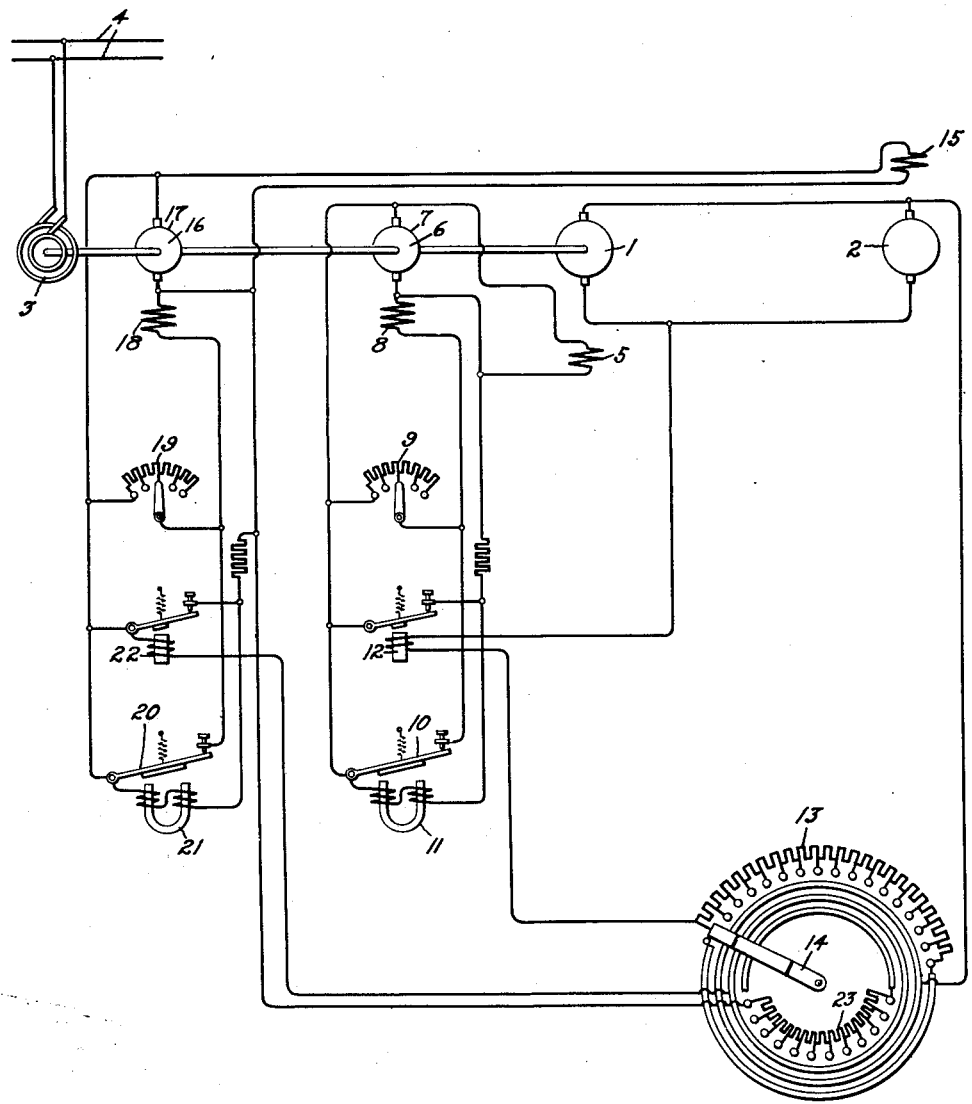
Inventor:
Walter L. Hamilton,
by *Albert G. Davis*
His Attorney.

UNITED STATES PATENT OFFICE.

WALTER L. HAMILTON, OF HOLYOKE, MASSACHUSETTS, ASSIGNOR TO GENERAL ELECTRIC COMPANY, A CORPORATION OF NEW YORK.

MOTOR-CONTROL SYSTEM.

1,362,301. Specification of Letters Patent. Patented Dec. 14, 1920.

Application filed June 17, 1920. Serial No. 389,696.

*To all whom it may concern:*

Be it known that I, WALTER L. HAMILTON, a citizen of the United States, residing at Holyoke, in the county of Hampden, State of Massachusetts, have invented certain new and useful Improvements in Motor-Control Systems, of which the following is a specification.

My invention relates to motor control systems and is particularly applicable to systems of control of the character employed for paper machine motors or the like, which are operated at different constant speeds.

One system of control for such motors comprises a motor supplied with current from a separately excited generator, a prime mover driving the generator, an exciter supplying exciting current to the generator and motor, and usually driven by the same prime mover that drives the generator, and rheostats in the field circuits of the generator and motor for adjusting the speed of the motor. Such an arrangement is a very flexible system of control, but has the disadvantage of not keeping the speed of the motor constant, when the speed of the generator varies due to changes in the speed of the prime mover. It is evident that if the rheostats are set at certain values and the speed of the generator changes, the generator voltage changes and produces a change in the motor speed.

One object of my invention is to provide an arrangement whereby the speed of the motor remains constant irrespective of any change in the speed of the generator produced by changes in speed of the prime mover. In accordance with my invention, I provide means for automatically maintaining the voltage of the generator constant at any desired value irrespective of any change in the generator speed and means for maintaining the voltage impressed upon the motor field winding constant at any desired value.

My invention will be better understood from the following description taken in connection with the accompanying drawing and its scope will be pointed out in the appended claims.

Referring to the drawing, which illustrates one embodiment of my invention, 1 represents a generator supplying current to the armature of a motor 2, the speed of which is to be regulated. The generator 1 may be driven by any suitable prime mover, the speed of which remains substantially constant. I have shown the generator as being driven by an alternating current motor 3 which is supplied with current from the alternating current mains 4. The generator 1 is provided with a separately excited field winding 5 which is connected to an exciter 6 driven by the alternating current motor 3. The exciter 6 is provided with an armature 7 and a shunt field winding 8 in series with which is connected an adjustable resistance 9.

In order to maintain the voltage of the generator 1 constant, I provide a voltage regulator 10, which may be of any suitable type, but which I have shown as being of the Tirrill type. This regulator comprises a relay 11 having an armature which in its normal position completes a shunt circuit around the resistance 9 and a coil which is connected to the terminals of the exciter 7, and a relay 12 having an armature which in its normal position completes a shunt circuit around the coil of the relay 11 and a coil which is connected to the terminals of the generator 1. The coil of the relay 12 is so designed that when the voltage of the generator 1 exceeds a predetermined value the relay 12 attracts its armature thereby opening the shunt circuit around the coil of the relay 11. The relay 11 becomes energized and, by attracting its armature, opens the shunt circuit around the resistance 9, thereby descreasing the excitation of the exciter 6. The voltage of the exciter is thereby decreased so that the excitation and the voltage of the generator 1 are reduced. When the voltage of the generator 1 drops below the predetermined value, the armature of the relay 12 completes the shunt circuit around the coil of relay 11 which becomes deënergized. The armature of relay 11 then closes the shunt circuit around the resistance 9 so as to increase the voltage of the exciter 6, which in turn causes the voltage of the generator 1 to be increased. It will be understood that the armatures of the relays 11 and 12 will be in rapid vibration and will cause the current in the field winding 5 to have such a value as to maintain the voltage of the generator 1 at a constant value irrespective of any change in the speed thereof produced by a change in the speed of the driving motor 3 due for example to a change in the frequency or voltage of the alternating current mains 4.

In order to vary the setting of the regulator 10 so that the voltage which the regulator maintains constant may be changed to vary the speed of the motor 2, I provide an adjustable resistance 13 which is adapted to be inserted in the circuit of the coil of relay 12 by means of a movable arm 14.

The motor 2 is provided with a field winding 15 which is connected to an exciter 16 driven by the driving motor 3. The motor 16 is provided with an armature 17 and a shunt field winding 18 in series with which is connected an adjustable resistance 19.

In order to maintain the voltage impressed upon the field winding 15 constant, I provide the exciter 16 with a voltage regulator 20, which may be of any suitable type, but which I have shown as being of the Tirrill type. This regulator comprises a relay 21 having an armature, which, in its normal position, completes a shunt circuit around the resistance 19 and a coil connected to the terminals of the exciter 16, and a relay 22 having an armature, which, in its normal position, completes a shunt circuit around the coil of the relay 21 and a coil connected to the terminals of the exciter 16. The coil of the relay 22 is so designed that when the voltage of the exciter 16 exceeds a predetermined value the shunt circuit around the coil of relay 21 is open. Relay 21 then becomes energized and opens the shunt circuit around the resistance 19, thereby increasing the excitation of the exciter 16 so as to restore the voltage of the exciter to the predetermined value. When the voltage of the exciter drops below the predetermined value the armature of the relay 22 is restored to its normal positon, thereby completing the shunt circuit around the coil of relay 21. Relay 21 then becomes deenergized and its armature closes the shunt circuit around the resistance 19. Thereupon the excitation of the exciter 16 is increased and the voltage of the exciter restored to the predetermined value. It will be understood that the armatures of the relays 21 and 22 will be in rapid vibration and will cause the current in the field winding 18 to have such a value that the voltage impressed upon the motor field winding 15 is maintained constant irrespective of any change in the speed of the driving motor 3.

In order to vary the setting of the regulator 20 so that the voltage which the regulator maintains constant may be changed to vary the speed of the motor 2, I provide an adjustable resistance 23 which is adapted to be inserted in the circuit of the coil of relay 22 by means of the movable arm 14.

From the above description, it will be evident that since the voltage regulator 10 maintains the voltage of the generator 1 constant irrespective of any change in the speed of the generator and the regulator 20 maintains the voltage of the exciter 16 constant irrespective of any change in the speed of the exciter, the voltages impressed upon the armature and field winding of the motor 2 are maintained constant and, therefore, the speed of the motor remains constant.

The movable arm 14 is shown in the drawing as being arranged to control both of the resistances 13 and 23, but it will be evident that these resistances may be controlled by separate arms. The arm 14 when in the position shown cuts all of the resistance 13 out of the circuit of the coil of relay 12 and connects all of the resistance 23 in the circuit of the coil of the relay 22. Therefore, with the arm in the position shown the generator 1 operates at its minimum voltage and the exciter 16 impresses its maximum voltage upon the field winding 15 to the motor 2 so that the motor 2 runs at its lowest constant speed.

When an increase in speed is desired, the arm 14 is moved in a clockwise direction thereby cutting in resistance in the circuit of the coil of relay 12. This increases the voltage of the generator 1 which is maintained constant by the regulator 11, thereby causing the speed of the motor to be increased. In the arrangement shown, no change in the resistance connected in the circuit of the coil of relay 22 is produced until the voltage of the generator has been brought to its maximum value. After all of the resistance 13 has been cut in, a further movement of the arm 14 in a clockwise direction cuts out the resistance 23 in the coil of the relay 22 without changing the resistance connected in the circuit of relay 12. This decreases the voltage of exciter 16 which the regulator 20 maintains constant, thereby decreasing the voltage impressed upon the motor field winding 15, which in turn causes the speed of the motor to increase.

It will be evident that in whatever position the arm 14 is placed, the regulators 10 and 20 will maintain a constant voltage impressed upon the motor armature and motor field winding respectively irrespective of any change in the speed of the generator 1 or in the speed of the exciter 16. Therefore, I have provided a system of control which insures a constant motor speed of any desired value throughout the range of the apparatus.

While I have shown and described only one embodiment of my invention, it will be understood that I do not limit my invention thereto since various modifications thereof will suggest themselves to those skilled in the art without departing from the spirit of my invention the scope of which is set forth in the annexed claims.

What I claim as new and desire to secure by Letters Patent of the United States, is:

1. In a system of speed control for a direct current motor, the combination of a generator supplying current to said motor, regulating means adapted to maintain the voltage of said generator constant at any desired value irrespective of changes in the speed of said generator, regulating means adapted to maintain the voltage impressed upon the field winding of said motor constant at any desired value, and means for varying the settings of said regulating means to change the voltages which said regulating means maintain constant.

2. In a system of speed control for a direct current motor, the combination of a generator supplying current to said motor, regulating means adapted to maintain the voltage of said generator constant at any desired value irrespective of changes in the speed of said generator, an exciter adapted to supply current to a field winding of said motor, a second regulating means adapted to maintain the voltage impressed upon the field winding of said motor constant at any desired value irrespective of changes in the speed of said exciter, and means for varying the settings of said regulating means to change the voltages which said regulating means maintain constant.

3. In a system of speed control for a direct current motor, the combination of a generator supplying current to said motor, a prime mover driving said generator, regulating means adaped to maintain the voltage of said generator constant at any desired value irrespective of changes in speed of said prime mover, an exciter driven by said prime mover and adapted to supply current to a field winding of said motor, a second regulating means adapted to maintain the voltage of said exciter constant at any desired value irrespective of changes in the speed of said prime mover, and means for varying the settings of said regulating means to change the voltages which said regulating means maintain constant.

4. In a system of speed control for a direct current motor, the combination of a generator supplying current to said motor, a prime mover driving said generator, an exciter driven by said prime mover and adapted to supply current to the field winding of said generator, regulating means adapted to vary the excitation of said exciter to maintain the voltage of said generator constant at any desired value irrespective of changes in the speed of said prime mover, a second exciter driven by said prime mover and adapted to supply current to a field winding of said motor, a second regulating means adapted to maintain the voltage of said second exciter constant at any desired value irrespective of changes in the speed of said prime mover, and means for varying the settings of said regulating means to change the voltages which said regulating means maintain constant.

5. In a system of speed control for a direct current motor, the combination of a generator supplying current to said motor, a prime mover driving said generator, an exciter driven by said prime mover and adapted to supply current to the field winding of said generator, a resistance in the field circuit of said exciter, a relay responsive to the voltage of said generator and adapted to control a shunt circuit around said resistance, a variable resistance in the circuit of said relay for varying the operation of said relay, a second exciter driven by said prime mover and adapted to supply current to a field winding of said motor, a resistance in the field circuit of said second exciter, a second relay responsive to the voltage of said second exciter and adapted to control a shunt circuit around said last mentioned resistance and a variable resistance in the circuit of said second relay for varying the operation of said second relay.

In witness whereof, I have hereunto set my hand this 14th day of June, 1920.

WALTER L. HAMILTON.